(12) United States Patent
Kemp et al.

(10) Patent No.: US 8,851,507 B1
(45) Date of Patent: Oct. 7, 2014

(54) AIRBAGS WITH SEWN LEAK REDUCING PANELS

(71) Applicant: Autoliv ASP, Inc., Ogden, UT (US)

(72) Inventors: John D. Kemp, Murray, UT (US); G. Doyle Obray, North Ogden, UT (US); Kazuki Fujiwara, Tsuchiura (JP); Roger Rickenbach, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/843,386

(22) Filed: Mar. 15, 2013

(51) Int. Cl.
*B60R 21/232* (2011.01)
*B60R 21/231* (2011.01)
*B60R 21/235* (2006.01)

(52) U.S. Cl.
CPC ............ *B60R 21/231* (2013.01); *B60R 21/232* (2013.01); *B60R 2021/23538* (2013.01)
USPC ..................................... 280/728.2; 280/730.2

(58) Field of Classification Search
CPC .................... B60R 21/232; B60R 2021/23538
USPC ................................. 280/728.2, 730.2, 728.1
See application file for complete search history.

(56) References Cited

U.S. PATENT DOCUMENTS

| | | | |
|---|---|---|---|
| 6,206,409 B1* | 3/2001 | Kato et al. | 280/728.2 |
| 8,007,002 B2* | 8/2011 | Kalandek et al. | 280/740 |
| 8,091,917 B2* | 1/2012 | Weyrich et al. | 280/728.2 |
| 2004/0173999 A1* | 9/2004 | Thomas et al. | 280/728.3 |
| 2011/0049848 A1* | 3/2011 | Walston et al. | 280/730.2 |

FOREIGN PATENT DOCUMENTS

| GB | 2401835 A | 11/2004 |
|---|---|---|
| JP | 2012086721 | 5/2012 |

* cited by examiner

*Primary Examiner* — Keith Frisby
(74) *Attorney, Agent, or Firm* — Stoel Rives LLP (57) ABSTRACT

An airbag, or inflatable cushion assembly, can include an inflatable cushion and a throat liner. The throat liner can be coupled to an interior surface of the inflatable cushion at one or more coupling sites. The one or more coupling sites can include one or more panels that can be coupled to at least a portion of both of the inflatable cushion and the throat liner. The one or more panels can be configured to control or inhibit egress of an inflation gas at the one or more coupling sites.

31 Claims, 10 Drawing Sheets

AIRBAGS WITH SEWN LEAK REDUCING PANELS

BACKGROUND

Vehicle airbags are mounted to a vehicle and deploy so as to prevent an occupant from impacting vehicular structures and/or to prevent an occupant from being ejected from a vehicle in a collision. In some instances, the airbags can suffer from one or more drawbacks or may perform less than optimally in one or more respects. Embodiments disclosed herein provide improvement in performance of airbags.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" generally refers to an inflatable curtain airbag or cushion, although the principles discussed may apply to other airbag types in other embodiments.

Inflatable curtain airbags typically extend longitudinally within the vehicle and are usually coupled to or next to the roof rail of the vehicle. In an undeployed state, inflatable curtain cushions are typically rolled and/or folded, and may be retained in the undeployed configuration by being wrapped in a restraint at various attachment points at which the inflatable airbag is attached to the vehicle, or by being enclosed in a restraint, such as a sleeve or sock. In a deployed state, an inflatable curtain cushion may expand and burst free from the restraint to cover at least a portion of the side windows and one or more pillars of the vehicle. In some embodiments, inflatable curtain cushions may cover one or more of the A-, B-, C-, and D-pillars of a vehicle. For example, in some embodiments, the inflated curtain airbag may extend from the A-pillar to the C-pillar of the vehicle. In other embodiments, a deployed inflatable curtain cushion may extend from the A-pillar to the D-pillar of the vehicle.

In a collision event, the inflatable curtain cushion may be inflated by an inflator and change conformation from being rolled and/or folded in the packaged state to being extended and/or inflated in a deployed state. In some arrangements, the amount of gas from the inflator that is retained within the inflatable curtain determines how hard or soft the cushioning of the curtain will be. Other factors may also affect the cushioning abilities of the inflatable curtain airbag.

Some inflatable curtain cushions may be configured to serve dual functions of cushioning and ejection prevention. During a collision event, the curtain may cushion the head and upper body of an occupant, and during a roll-over event, the cushion may function to help retain the occupant within the vehicle. The two functions can require significantly different time-scales. In certain instances, inflatable curtains are configured to provide cushioning during a side impact event for up to about 500 milliseconds. However, during a roll-over event, the inflatable curtain may need to cushion an occupant and protect against occupant ejection for a much longer period, such as up to about seven seconds. Inflatable curtain cushions help mitigate the risk of occupant ejection by forming a barrier between the occupant and the side windows. Embodiments disclosed herein can be used in inflatable airbag arrangements for which longer inflation gas retention properties are desired. For example, in some embodiments, the inflatable cushion of an inflatable cushion assembly can be configured to retain inflation gas therein for sustained periods of time, even when the chambers are compressed by contact with a moving occupant during a collision event.

Some inflatable airbags have a throat portion that is in fluid communication with an inflator. The inflator may be configured to generate inflation gas in response to predetermined conditions. The inflatable airbag may comprise one or more voids or chambers for receiving the inflation gas. The inflation gas may enter the inflatable airbag at a high velocity and/or high temperature. To protect the material of which the inflatable airbag is formed, a throat liner may be coupled thereto. In some embodiments, the throat liner may be further coupled to the inflator. The throat liner may be positioned in the void of the inflatable airbag at the throat portion. In some instances the throat liner may extend beyond the throat portion along a longitudinal length of the inflatable airbag. Throat liners of any length and at any position within the void of the throat portion and/or the inflatable airbag are within the scope of this disclosure.

In some embodiments, the throat liner may be made of the same material as the throat portion and the inflatable airbag. In other embodiments, the throat liner may be made of a different material than the throat portion and/or the inflatable cushion. The materials may have different strengths, melting temperatures, and other relevant properties.

In some airbags the throat liner may be coupled to an interior surface of the airbag and/or the throat portion at one or more coupling sites. In some instances there may be four coupling sites. In other instances, there may be more or less than four coupling sites. In some airbags the throat liner may be coupled to the inflatable cushion and/or the throat portion by stitching. Inflation gas present in the inflatable cushion may escape from the inflatable bag at the one or more coupling sites. For example, upon inflation of an airbag, the material of which the inflatable airbag is formed may stretch and/or expand at or adjacent to the one or more coupling sites, resulting in egress or escape of the inflation gas from the inflated airbag. In another example, the one or more coupling sites may comprise stitching. Formation of the stitching may generate one or more holes in the material comprising the airbag. Upon inflation of the airbag the one or more holes may expand and permit the inflation gas to egress from the void of the airbag.

Figure 1A:
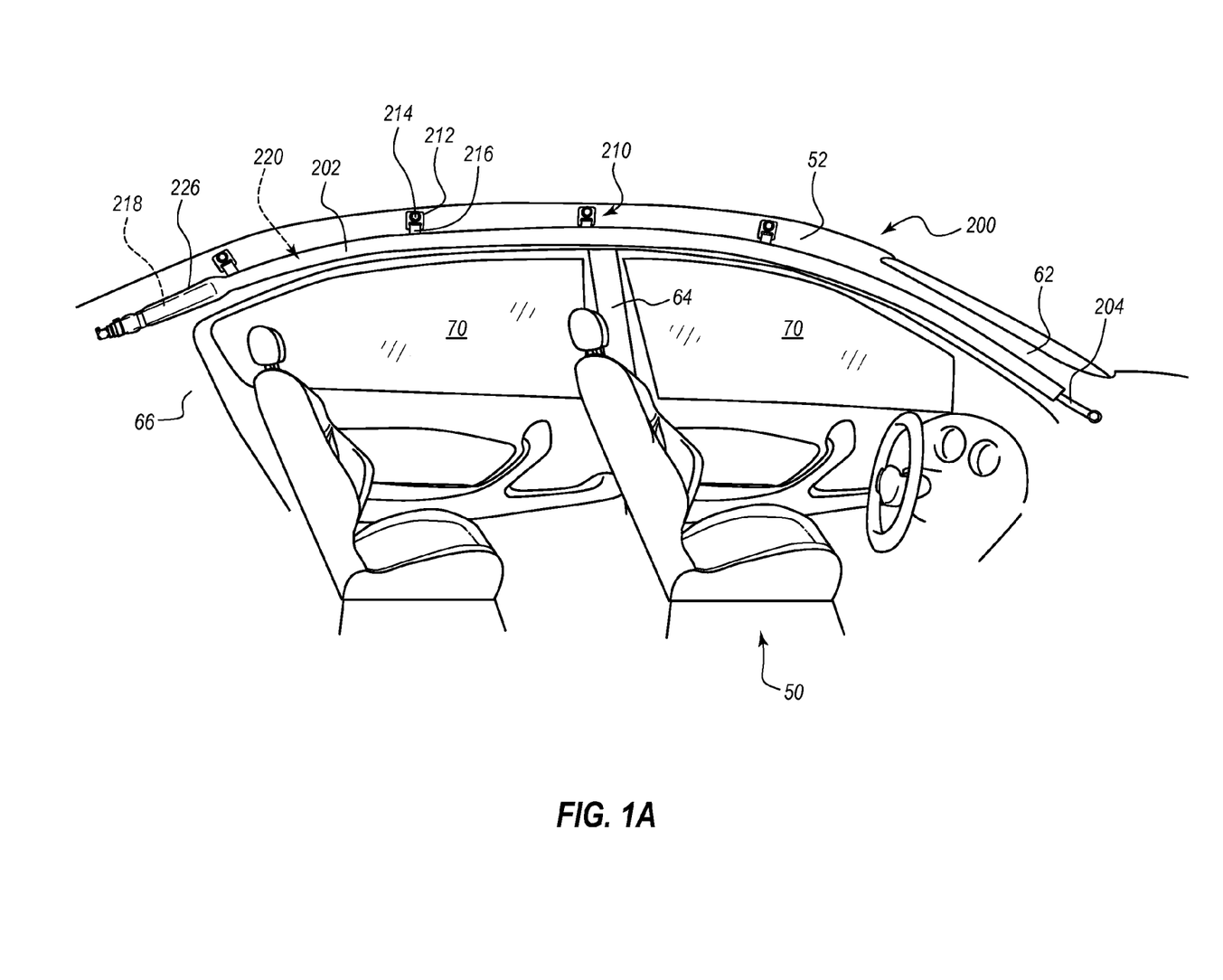
FIG. 1A is an elevation view of an embodiment of an inflatable cushion assembly mounted within a vehicle, wherein the assembly is shown in a packaged configuration.
Figure 1B:
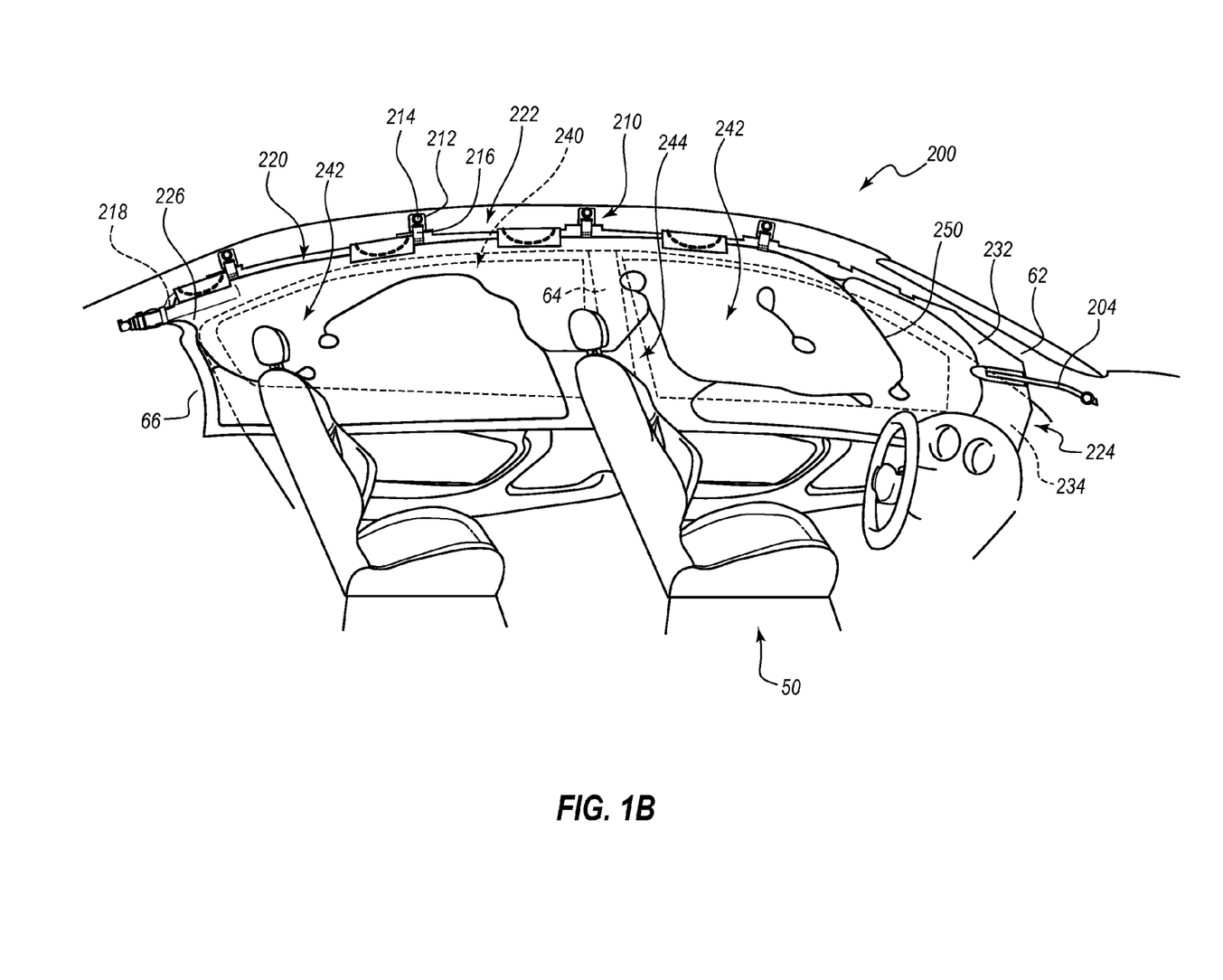
FIG. 1B is another elevation view of the inflatable cushion assembly of FIG. 1A shown in a deployed configuration.

FIGS. 1A and 1B depict an embodiment of an inflatable cushion assembly 200 mounted within a vehicle 50. In FIG. 1A, the assembly 200 is in a packaged configuration, whereas in FIG. 1B, the assembly 200 is in a deployed configuration.

With reference to FIG. 1A, the assembly 200 can include an inflatable cushion 220 (see also FIG. 1B), which can be secured to the vehicle 50 in any suitable manner. The inflatable cushion 220 may also be referred to herein as a cushion or as an airbag. In the illustrated embodiment, the inflatable cushion 220 is positioned at an interior of a restraint 202 so as to be retained in a packaged configuration. The restraint 202 may be of any suitable variety, such as one or more straps, tethers, socks, or sleeves. In the illustrated embodiment, the restraint 202 comprises a sleeve that extends along substantially a full length of the inflatable cushion 220, such that a majority of the inflatable cushion 220 is obscured from view by the sleeve in FIG. 1A.

The assembly 200 can be attached to the vehicle 50 in any suitable manner. For example, in some embodiments, the assembly 200 includes one or more fastening assemblies 210 that are configured to secure one or more of the inflatable cushion 220 and the restraint 202 to the vehicle 50. The assembly 200 can be mounted inside the vehicle 50 adjacent to a roof of the vehicle, such as to a roof rail 52. In the illustrated embodiment, each fastening assembly 210 includes a tether or strap 216 that is secured to mounting hardware, such as a tab 212 that is secured to the roof rail 52 via a fastener 214, such as a bolt. Any other suitable fastening arrangement is contemplated. Each strap 216 may be coupled with one or more of the inflatable cushion 220 and the restraint 202 in any suitable manner.

A forward end of the assembly 200 can include a strap 204, which may be secured to the vehicle in any suitable manner. For example, in the illustrated embodiment, the strap 204 is attached to a lower end of an A-pillar 62. As shown in FIG. 1B, the strap 204 can be attached to a forward end 224 of the inflatable cushion 220. An upper end 222 of the inflatable cushion 220 can be attached to the straps 216. In some embodiments, the straps 216 are sewn to the inflatable cushion 220. In other embodiments, the straps 216 may be integrally formed with the inflatable cushion 220, and may extend from one or more panels of the inflatable cushion 220.

With continued reference to FIG. 1A, the assembly can further include an inflator 218, which may be positioned within a throat 226 of the inflatable cushion 220. The inflator 218 can be anchored to the roof rail 52, and may be of any suitable variety. In some embodiments, the inflator 218 comprises either a pyrotechnic device or a stored gas inflator. The inflator 218 can be in electronic communication with vehicle sensors which are configured to detect vehicle collisions and/or rollovers. Upon detection of predetermined conditions, the sensors can activate the inflator 218 and the inflatable cushion 220 may be rapidly inflated.

With reference to FIGS. 1A and 1B, the inflatable cushion 220 can be configured to cover various structures of the vehicle 50 when deployed. For example, in some embodiments, at least a portion of the deployed inflatable cushion 220 can cover one or more of the A-pillar 62, a B-pillar 64, and a C-pillar 66, and/or one or more side windows 70. The illustrated embodiment is configured to cover the B-pillar 64, and each of the side windows 70.

With reference to FIG. 1B, the inflatable cushion 220 can define various portions that provide different amounts of cushioning relative to the vehicle structures. In particular, the inflatable cushion 220 can include various inflatable chambers, cells, or cushion segments that are configured to be filled with inflation gases in order to cushion a vehicle occupant during a collision event. The cushion segments 242 can be configured to deploy at strategic areas at which a vehicle occupant may benefit most from the cushioning. The illustrated embodiment includes a plurality of cushion segments 242 that are in fluid communication with an inflation gas delivery channel 240. In some embodiments, inflation gases may be retained within a given cushion segment 242 to maintain the cushion segment 242 in an inflated or filled configuration, even when a vehicle occupant presses against the cushion segment 242. Such an arrangement can allow the cushion segment 242 to provide a desired amount of protection to the vehicle occupant.

In some embodiments, the inflatable cushion 220 can include one or more non-inflatable regions 244, one or more of which may be positioned between adjacent cushion segments 242 or at an interior of a cushion segment 242 (e.g., so as to be encompassed by a cushion segment 242).

In various embodiments, at least a portion of one or more of the cushion segments 242 and the non-inflatable regions 244 can be defined by one or more boundary seams 250. The one or more boundary seams 250 may be formed in any suitable manner. For example, in some embodiments, the one or more boundary seams 250 may comprise one or more of stitches, welds (e.g., radiofrequency welds), and/or adhesives. In other or further embodiments, the boundary seams 250 may be woven portions that are formed via one-piece weaving techniques. As further discussed below, in some embodiments, the boundary seams 250 may join together two or more pieces of fabric, such as a front face 232 and a rear face 234. In some embodiments, the one or more boundary seams 250 are substantially airtight so as to be able to retain inflation gas within a given cushion segment 242. The one or more boundary seams 250 can be said to fluidly isolate adjacent cushion segments 242 from each other. In other embodiments, the one or more boundary seams 250 may not be airtight, but may instead resist egress of gases from a cushion segment 242.

The shapes of the inflatable cushion 220 and its various components, such as the segments 242, that are depicted in FIG. 1B are not necessarily limiting. These shapes may be altered, such as to accommodate differently shaped vehicles. In some embodiments, the inflated inflatable cushion 220 is configured to fit within the side window wells of vehicle 50. The inflatable cushion 220 may comprise a contiguous piece of material manufactured using a one-piece woven technique, in some embodiments, or in other or further embodiments, may be manufactured by cutting and sewing separate pieces of material (e.g., nylon fabric) together. For example, the front and rear faces 232, 234 may be formed from separate sheets of material that are joined together. In other embodiments, the front and rear faces 232, 234 may be formed from a unitary piece of material.

As can be appreciated from FIGS. 1A and 1B, when the inflatable cushion 220 is in the packaged configuration, all components of the inflatable cushion 220 can be at an interior of the restraint 202. In the illustrated embodiment, the restraint 202 is a sleeve that covers an entirety of the inflatable cushion 220. However, in other embodiments, the restraint 202 may merely comprise a plurality of straps, and each strap may encompass a portion of various components of the inflatable cushion 220, such as, for example, portions of the inflation gas delivery channel 240.

Figure 2:
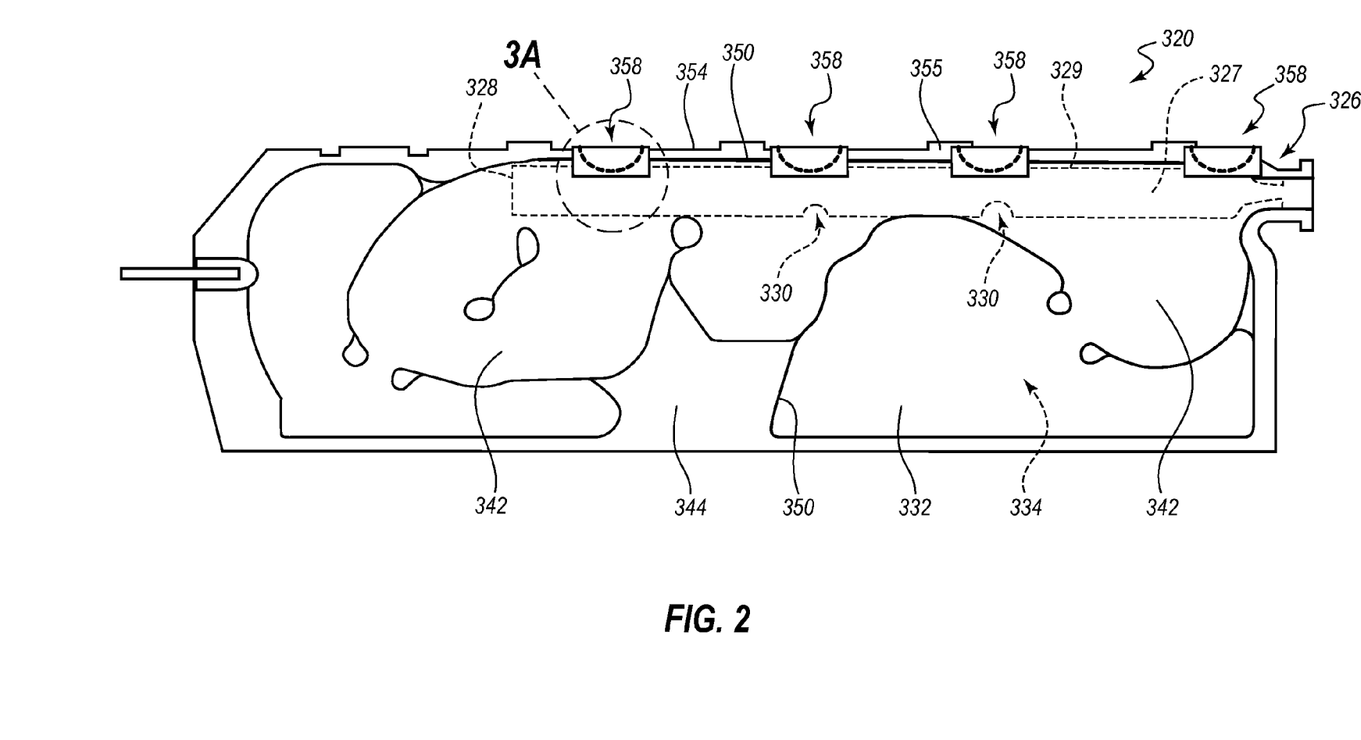
FIG. 2 is an elevation view of an embodiment of an inflatable cushion that is compatible with the inflatable cushion assembly of FIGS. 1A and 1B.

FIG. 2 depicts another embodiment of an inflatable cushion 320 that can resemble the inflatable cushion 220 described above in certain respects, and that can be compatible with the assembly 200. Accordingly, like features are designated with like reference numerals, with the leading digits incremented to "3." Relevant disclosure set forth above regarding similarly identified features thus may not be repeated hereafter. Moreover, specific features of the inflatable cushion 320 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant description of such features apply equally to the features of the inflatable cushion 320. Any suitable combination of the features and variation of the same described with respect to the inflatable cushion 220 can be employed with the inflatable cushion 320, and vice versa. This pattern of disclosure applies equally to further embodiments depicted in subsequent figures and described hereafter, wherein the leading digits may be further incremented.

FIG. 2 depicts an elevation view of the inflatable cushion 320. In FIG. 2, the inflatable cushion 320 is shown in an unfilled state. The inflatable cushion 320 may be in such a condition prior to packaging thereof into a packaged state such as that depicted in FIG. 1A, which may be accomplished via folding and/or rolling the unfilled airbag.

The inflatable cushion 320 may include a throat portion 326 that may be configured to receive at least a portion of an inflator 218 therein and/or to be coupled with the inflator 218. In the illustrated embodiment, the inflatable cushion 320 is a sealed cushion without vents wherein the inflatable cushion 320 includes a front face 332 and a rear face 334 that meet at an edge 354. As illustrated, the edge 354 may comprise a plurality of cut features 355 (e.g., tabs). In some embodiments, the cut features 355 may be used in attachment of the inflatable cushion 320 to a vehicle. The front face 332 and the rear face 334 cooperate to define a void or chamber for receiving an inflation gas from the inflator 218. In other embodiments, the inflatable cushion 320 may comprise a contiguous piece of material manufactured using a one-piece woven technique. In some embodiments, the inflatable cushion 320 may be manufactured by cutting and sewing separate pieces of material (e.g., nylon fabric) together. In the illustrated embodiment, the inflatable cushion 320 further comprises a boundary seam 350 adjacent to the edge 354 of the inflatable cushion 320. The boundary seam 350 also defines the one or more cushion segments 342 and non-inflatable regions 344. In other embodiments, the inflatable cushion 320 may comprise a plurality of boundary seams 350 at or adjacent to the edge 354. The one or more boundary seams 350 may fluidly seal the void of the inflatable cushion 320. In yet other embodiments, the one or more boundary seams 350 may not be airtight but may instead resist egress of gasses from the void of the inflatable cushion 320.

The inflatable cushion 320 can include a throat liner 327. The throat liner 327 may comprise an aperture for passage of the inflation gas into the inflatable cushion 320. In the illustrated embodiment, the throat liner 327 comprises a first exterior surface 329, and the throat liner 327 is disposed at a position within the void of the inflatable cushion 320. The first exterior surface 329 is positioned at or adjacent to the boundary seam 350, and the throat liner 327 is coupled to the inflatable cushion 320 at a plurality of coupling sites 358. In other embodiments, the throat liner may be positioned at other locations within the void of the inflatable cushion 320. In the illustrated embodiment, there are four coupling sites 358. In some embodiments, there may be less than four coupling sites 358, and in other embodiments there may be more than four coupling sites 358. In some embodiments, the throat liner 327 may comprise two panels that cooperate to form an aperture for passage of an inflation gas into the inflatable cushion 320. In other embodiments, the throat liner 327 may be formed from a unitary piece of material. For example, the throat liner 327 may be woven by a one-piece woven technique.

The throat liner 327 may be configured to receive at least a portion of the inflator 218 therein and/or to be coupled with the inflator 218. In the illustrated embodiment the throat liner 327 comprises an opening 328 at a position distal to the inflator 218 and two vents 330 spaced along a longitudinal length of the throat liner 327. In some embodiments, the throat liner 327 can comprise one or more vents 330 spaced along a longitudinal length of the throat liner 327. The one or more vents 330 and/or openings 328 can be configured to distribute the inflation gas into various portions and/or segments of the inflatable cushion 320. Referring again to FIG. 2, the inflatable cushion 320 is depicted as being elongate, and the throat liner 327 extends beyond an intermediate point of the inflatable cushion 320. In other embodiments, the throat liner 327 may be substantially restricted to a longitudinal length of the throat portion 326. Throat liners 327 of various lengths are contemplated.

Figure 3A:
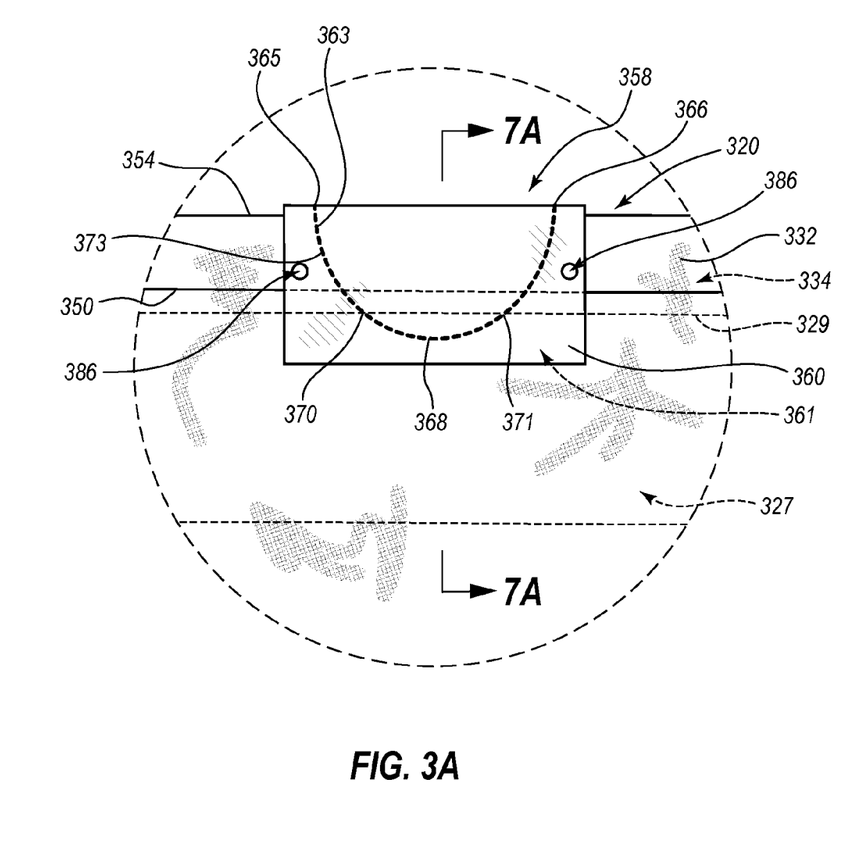
FIG. 3A is an enlarged elevation view of a portion of the inflatable cushion of FIG. 2 taken along the view line 3A in FIG. 2 depicting one embodiment of a coupling site.
Figure 3B:
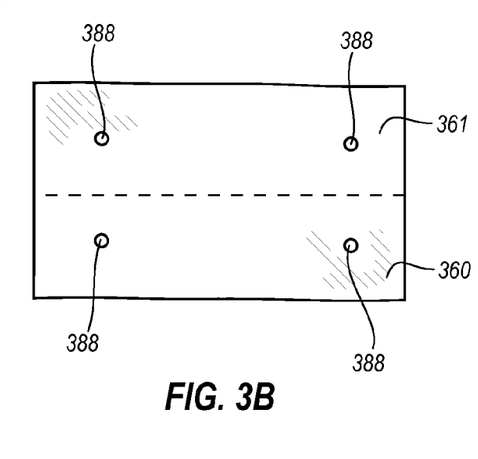
FIG. 3B is a top plan view of a first panel and a second panel of the coupling site of FIG. 3A.

FIG. 3A is an enlarged elevation view of a portion of the inflatable cushion 320 of FIG. 2 taken along the view line 3A in FIG. 2 depicting one embodiment of a coupling site 358. As described above, the inflatable cushion 320 may comprise one or more coupling sites 358. In the illustrated embodiment, the coupling site 358 includes a first panel 360 and a second panel 361. FIG. 3B depicts a top plan view of the first and second panels 360, 361 before they are positioned at the coupling site 358. The dashed line indicates where the first and second panels 360, 361 can fold over the edge 354 of the inflatable cushion 320, as further described below. Referring to FIG. 3A, the first panel 360 is coupled to an exterior surface of the front face 332 of the inflatable cushion 320, and the second panel 361 is coupled to an exterior surface of the rear face 334 of the inflatable cushion 320. In other embodiments, the first and second panels 360, 361 may be coupled to the inflatable cushion 320 and/or the throat liner 327 at other suitable positions (i.e., to an exterior surface of the throat liner 327). In FIG. 3A, stitching 363 couples at least a portion of the first and second panels 360, 361; the front and rear faces 332, 334 of the inflatable cushion 320; and the throat liner 327 at the coupling site 358. In other embodiments, the first and second panels 360, 361; the front and rear faces 332, 334 of the inflatable cushion 320; and the throat liner 327 may be coupled by one or more of welds (e.g., radiofrequency welds), adhesives, and/or other suitable fasteners. In the illustrated embodiment, the first and second panels 360, 361 overlap at least the boundary seam 350 of the inflatable cushion 320 and the first exterior surface 329 of the throat liner 327. Such an overlap may enhance the seal of the inflatable cushion 320 at the one or more coupling sites 358. To maintain the fluid seal of the inflatable cushion 320, the panels 360, 361 may be configured such that they do not substantially inflate upon inflation of the inflatable cushion 320 and/or the throat liner 327.

In some embodiments, the first and second panels 360, 361 may be integral, while in other embodiments, the first and second panels 360, 361 may be discrete. In FIGS. 3A and 3B, the first and second panels 360, 361 are integral. The first and second panels 360, 361 may be formed of silicone, foam tape, or other suitable materials. In the illustrated embodiment, the first and second panels 360, 361 are folded over the edge 354 of the inflatable cushion 320 at or adjacent to the dashed line indicated in FIG. 3B. The first panel 360 extends from the edge 354 of the inflatable cushion 320 along an exterior surface of the front face 332 of the inflatable cushion 320 and overlaps at least the boundary seam 350 and the first exterior surface 329 of the throat liner 327. The second panel 361 extends from the edge 354 of the inflatable cushion 320 along an exterior surface of the rear face 334 of the inflatable cushion 320 and overlaps at least the boundary seam 350 and the first exterior surface 329 of the throat liner 327 on an opposite side or face of the inflatable cushion 320.

In the illustrated embodiment, the stitching 363 is substantially curved and includes a first end 365 and a second end 366. The first and second ends 365, 366 are spaced along a longitudinal length of the inflatable cushion 320 and are positioned at or adjacent to the edge 354 of the inflatable cushion 320. As illustrated, the stitching 363 further comprises a first portion 368, wherein the first portion 368 comprises a first transition point 370 and a second transition point 371. The transition points 370, 371, and the other transition points described below and in other and future embodiments, represent one or more positions along a length of a stitching, like the stitching 363, wherein there is a transition or change in the number or identity of components or layers being coupled by the stitching. For example, referring again to FIG. 3A, at a position along the stitching 363 that is distal to the edge 354 in relation to the first transition point 370, the stitching couples each of the first and second panels 360, 361; the front and rear faces 332, 334 of the inflatable cushion 320; and the throat liner 327; whereas at a position along the stitching 363 that is proximal to the edge 354 in relation to the first transition point 370, the stitching 363 couples only each of the first and second panels 360, 361; and the front and rear faces 332, 334 of the inflatable cushion 320.

In FIG. 3A, the first portion 368 is positioned opposite from the edge 354 of the inflatable cushion 320, and the first portion 368 stitchingly couples each of the first and second panels 360, 361; the front and rear faces 332, 334 of the inflatable cushion 320; and the throat liner 327. As illustrated, the stitching 363 further includes a second portion 373. The second portion 373 extends toward both of the first end 365 and the second end 366 of the stitching 363 from both of the first transition point 370 and the second transition point 371, respectively. The second portion 373 stitchingly couples each of the first and second panels 360, 361; and the front and rear faces 332, 334 of the inflatable cushion 320.

The shape of the stitching 363 and the configuration of its various components, such as the first portion 368, that are depicted in FIG. 3A are not necessarily limiting. The shapes and configurations may be altered, such as to accommodate various manufacturing techniques and/or different materials. For example, the stitching 363 may be square-shaped or triangle-shaped, and the stitching 363 may comprise more than two portions.

As illustrated, the inflatable cushion 320 can further comprise one or more alignment landmarks 386 spaced along a longitudinal length of the inflatable cushion 320 at or adjacent to the edge 354 of the inflatable cushion 320. Also, as illustrated in FIG. 3B, the first and second panels 360, 361 can comprise one or more placement holes 388. The placement holes 388 may be configured to aid in positioning the first and second panels 360, 361 at the one or more coupling sites 358. An illustrative method for aligning the first and second panels 360, 361 with the one or more coupling sites 358 can include aligning the one or more placement holes 388 with one or more corresponding alignment landmarks 386. The method can further include coupling the first and second panels 360, 361 to the inflatable cushion 320 at the one or more coupling sites 358 at a position wherein the one or more placement holes 388 are aligned with the corresponding one or more alignment landmarks 386. Further use of similar methods for placement of one or more components are disclosed in U.S. Pat. No. 8,056,924 titled INFLATABLE AIRBAG ASSEMBLIES WITH ALIGNMENT APERTURES, which issued on Nov. 15, 2011, the entire contents of which are incorporated by reference herein.

Figure 4:
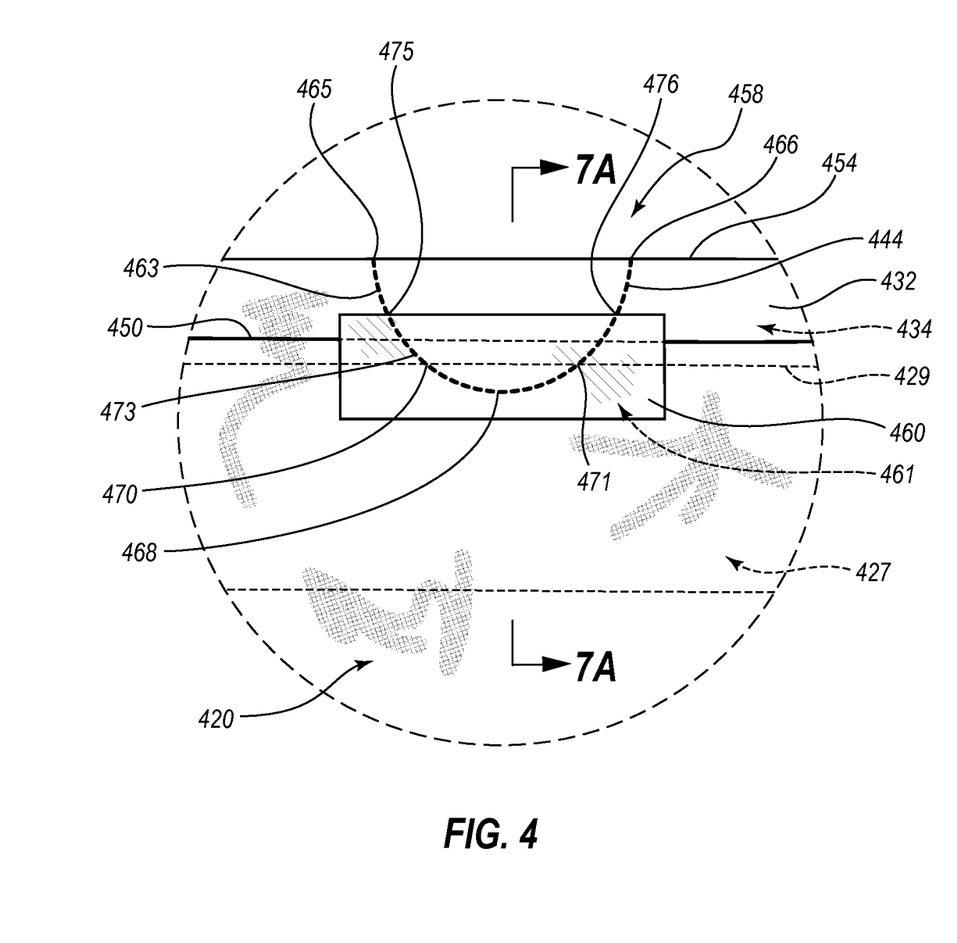
FIG. 4 is an enlarged elevation view of a portion of another embodiment of an inflatable cushion such as that shown in FIG. 2 depicting another embodiment of a coupling site, wherein the view is similar to that shown in FIG. 3A.

FIG. 4 depicts an enlarged elevation view of a portion of another embodiment of an inflatable cushion 420 such as that shown in FIG. 2 depicting another embodiment of a coupling site 458, wherein the view is similar to that shown in FIG. 3A. Embodiments of the coupling site 458 are compatible with embodiments of the assembly 200 discussed above. In the illustrated embodiment, the first panel 460 and the second panel 461 are discrete. The first and second panels 460, 461 are positioned to overlap at least the boundary seam 450 of the inflatable cushion 420 and the first exterior surface 429 of the throat liner 427. As described above, such an overlap may enhance the seal of the inflatable cushion 420 at the one or more coupling sites 458. In embodiments, at least one of the first and second panels 460, 461 may comprise foam tape. In other embodiments both of the first and second panels 460, 461 may comprise foam tape. In yet other embodiments, the first and second panels 460, 461 may comprise silicone, nylon, or any other suitable material. The first and second panels 460, 461 may also comprise an adhesive and may be adhesively coupled to the exterior surface of the inflatable cushion 420. The first and second panels 460, 461 may be configured such that they do not substantially inflate upon inflation of the inflatable cushion 420.

In the illustrated embodiment, the stitching 463 is substantially curved, including a first end 465 and a second end 466. The first and second ends 465, 466 are spaced along a longitudinal length of the inflatable cushion 420 and may be positioned at or adjacent to the edge 454 of the inflatable cushion 420. In the illustrated embodiment, the stitching 463 further comprises a first portion 468, wherein the first portion 468 comprises a first transition point 470 and a second transition point 471. The first portion 468 is positioned opposite from the edge 454 of the inflatable cushion 420, and the first portion 468 stitchingly couples each of the first and second panels 460, 461; the front and rear faces 432, 434 of the inflatable cushion 420; and the throat liner 427. In the illustrated embodiment, the stitching 463 further comprises a second portion 473 comprising a third transition point 475 and a fourth transition point 476. The second portion 473 extends toward the edge 454 of the inflatable cushion 420 from both of the first transition point 470 and the second transition point 471 to both of the third transition point 475 and the fourth transition point 476, respectively. The second portion 473 stitchingly couples each of the first and second panels 460, 461; and the front and rear faces 432, 434 of the inflatable cushion 420. The stitching 463 further comprises a third portion 444 extending from both of the third transition point 475 and the fourth transition point 476 to both of the first end 465 and the second end 466 of the inflatable cushion 420, respectively. As described above, other stitching and/or transition point configurations are also contemplated. Additionally, other coupling methods are contemplated, including, for example, welds (e.g., radiofrequency welds), adhesives, and/or other suitable fasteners.

Figures 5A, 5B:
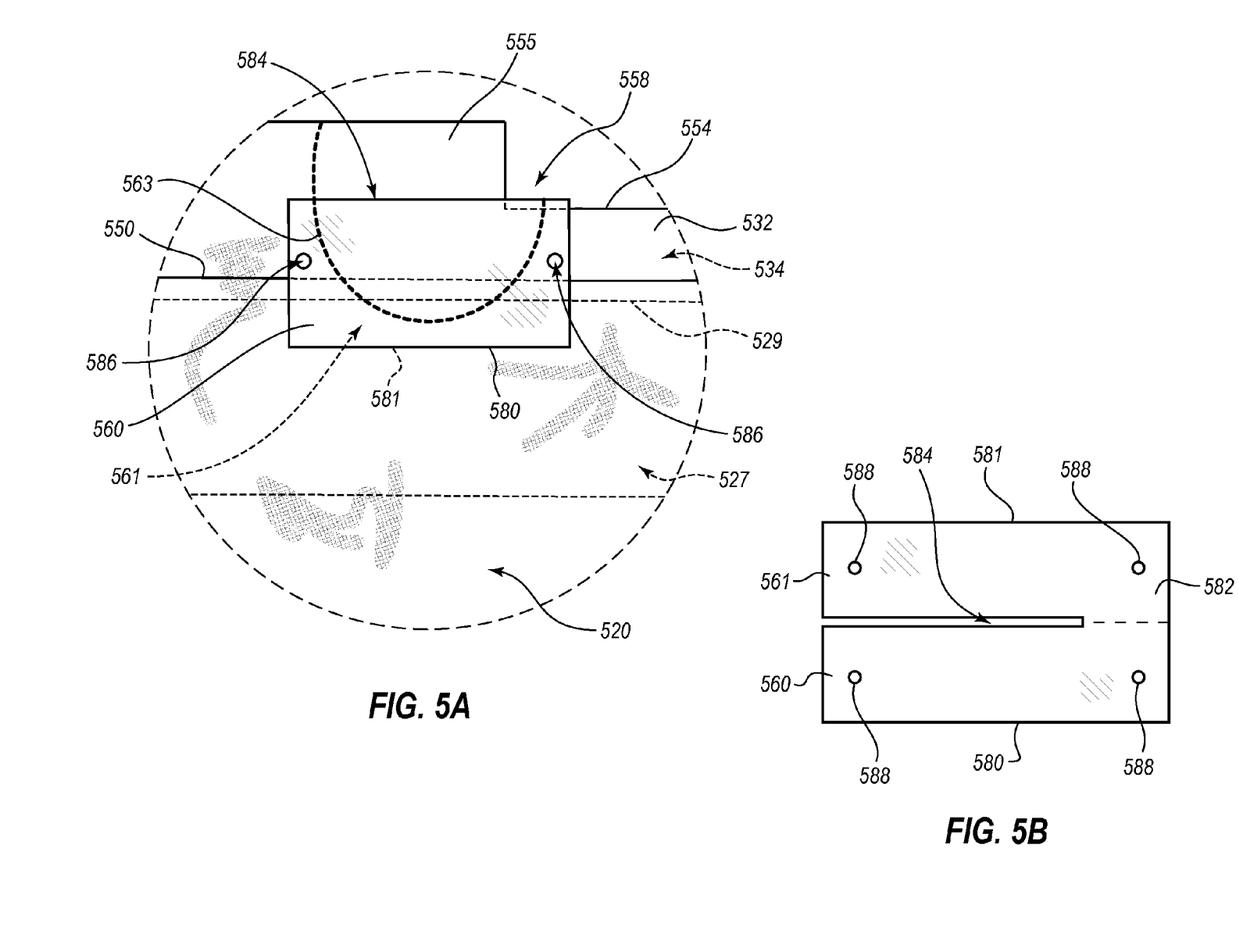
FIG. 5A is an enlarged elevation view of a portion of another embodiment of an inflatable cushion such as that shown in FIG. 2 depicting another embodiment of a coupling site, wherein the view is similar to that shown in FIG. 3A, but with respect to a different portion of the inflatable cushion.
FIG. 5B is a top plan view of a first panel and a second panel of the coupling site of FIG. 5A.

FIG. 5A is an enlarged elevation view of a portion of another embodiment of an inflatable cushion 520 such as that shown in FIG. 2 depicting another embodiment of a coupling site 558, wherein the view is similar to that shown in FIG. 3A, but with respect to a different portion of the inflatable cushion 320. Whereas FIG. 3A depicts the coupling site 358 that is most distal in relation to the throat portion 326, FIG. 5A depicts another embodiment of a coupling site 558 that is similar to the coupling site 358 that is the second coupling site 358 in relation to the throat portion 326 of FIG. 2, and wherein the coupling site 358 is at or adjacent to a cut feature 355. Embodiments of the coupling site 558 are compatible with embodiments of the assembly 200 discussed above. FIG. 5B depicts first and second panels 560, 561 that can be used in the coupling site 558 of FIG. 5A. In the illustrated embodiment, the coupling site 558 comprises the first and second panels 560, 561. The first and second panels 560, 561, as illustrated, are integral and comprise a first border 580, a second border 581 at a position opposite or substantially opposite from the first border 580, a middle portion 582 positioned between the first border 580 and the second border 581, and a slit 584 bisecting at least a portion of the first and second panels 560, 561 at the middle portion 582. The dashed line indicates a location where, or adjacent to the location where, the first and second panels 560, 561 may be folded over the edge 554 of the inflatable cushion 520. At the coupling site 558, the slit 584 is substantially longitudinally aligned with the edge 554 of the inflatable cushion 520. At least a portion of the first panel 560 is coupled to an exterior surface of the front face 532 of the inflatable cushion 520. Similarly, at least a portion of the second panel 561 is coupled to an exterior surface of the rear face 534 of the inflatable cushion 520. Further, as illustrated in FIG. 5A, the first border 580 and the second border 581 overlap at least the boundary seam 550 of the inflatable cushion 520 and the first exterior surface 529 of the throat liner 527. The stitching 563 may couple at least a portion of the first and second panels 560, 561; the front and rear faces 532, 534 of the inflatable cushion 520; and the throat liner 527 at the one or more coupling sites 558. As described for other embodiments above, the first and second panels 560, 561 may be configured such that they do not substantially inflate upon inflation of the inflatable cushion 520.

The shape of the first and second panels 560, 561 and their various components, such as the slit 584, that are depicted in FIGS. 5A and 5B are not necessarily limiting. The shapes may be altered, such as to accommodate various manufacturing techniques and/or different materials. For example, the first and second panels 560, 561 may be circular, triangular, or any other suitable shape, and the slit 584 may be curved or otherwise shaped to conform to different inflatable cushion 520 configurations.

Additionally, the slit 584 may be configured to permit the first and second panels 560, 561 to be coupled to the inflatable cushion 520 at or adjacent to various cut features 555 of the inflatable cushion 520. For example, the edge 554 of the inflatable cushion 520 may comprise one or more tabs, and the slit 584 may be configured to permit the first and second panels 560, 561 to be coupled to the inflatable cushion 520 at or adjacent to the one or more tabs. Referring to FIG. 5A, the cut feature 555 is present along the edge 554. The slit 584 permits the first and second panels 560, 561 to be coupled adjacent to the cut feature 555.

As illustrated, the inflatable cushion 520 further comprises a plurality of alignment landmarks 586 spaced along a longitudinal length of the inflatable cushion 520 at or adjacent to the edge 554 of the inflatable cushion 520. Also, as illustrated in FIG. 5B, the first and second panels 560, 561 comprise one or more placement holes 588 positioned between the first border 580 and the slit 584; and between the second border 581 and the slit 584. The placement holes 588 may be configured to aid in positioning the first and second panels 560, 561 at the one or more coupling sites 558. In other embodiments, there may be one or more placement holes 588, and the one or more placement holes 588 may be positioned on only one side of the slit 584. An illustrative method for aligning the one or more first and second panels 560, 561 with the one or more coupling sites 558 can include aligning the one or more placement holes 588 with one or more corresponding alignment landmarks 586. The method can further include coupling the one or more first and second panels 560, 561 to the inflatable cushion 520 at the one or more coupling sites 558 at a position wherein the one or more placement holes 588 are aligned with the corresponding one or more alignment landmarks 586.

Figure 6:
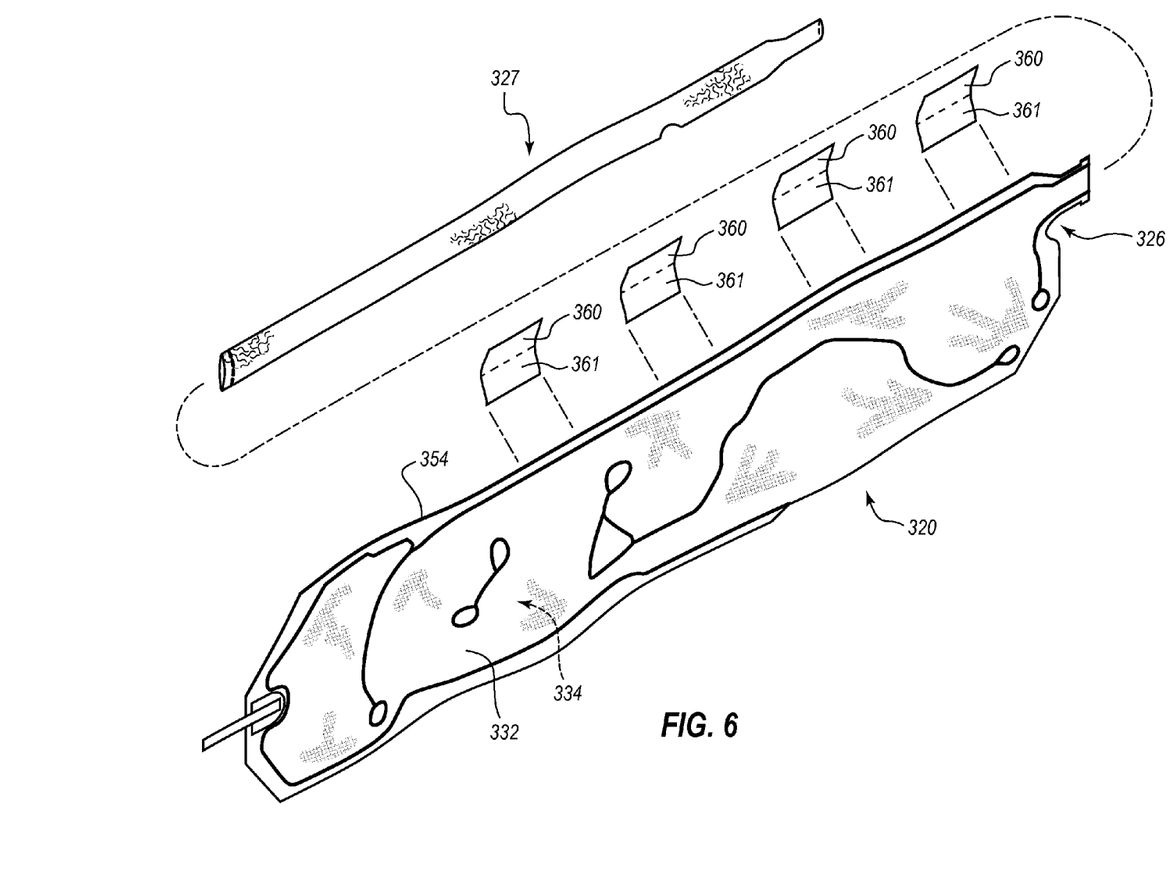
FIG. 6 is an exploded perspective view of the inflatable cushion of FIG. 2.

FIG. 6 is an exploded perspective view of the inflatable cushion 320 of FIG. 2. An illustrative method for coupling the throat liner 327 to the inflatable cushion 320 may include inserting the throat liner 327 through the throat portion 326 to a position within the void of the inflatable cushion 320. In another embodiment, wherein the inflatable cushion 320 is formed from two or more panels of material, the throat liner 327 may be positioned into the void of the inflatable cushion 320 prior to sealing the inflatable cushion 320. The method can further include coupling one or more first and second panels 360, 361 to the exterior surface of the inflatable cushion 320 at or adjacent to the edge 354 of the inflatable cushion 320. In the illustrated embodiment, the first and second panels 360, 361 are depicted as integral panels. In some embodiments, the first and second panels 360, 361 may comprise two or more discrete panels wherein a first panel 360 is coupled to the exterior surface of the front face 332 of the inflatable cushion 320 and wherein a second panel 361 is coupled to the exterior surface of the rear face 334 of the inflatable cushion 320. The method can further comprise coupling the throat liner 327, the inflatable cushion 320, and the one or more first and second panels 360, 361. The coupling can serve to secure the throat liner 327 at its desired position within the inflatable cushion 320 and/or the throat portion 326. Further, the coupling can comprise one or more of stitching, welding (e.g., radio frequency welding), adhesives, and/or other suitable fastening.

Figure 7A:
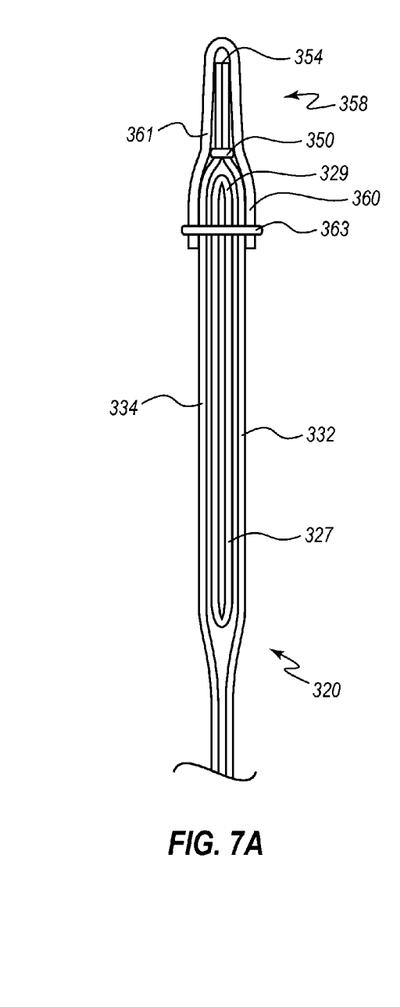
FIG. 7A is a cross-sectional view of the coupling site of FIG. 3A taken along line 7A-7A before inflation of the inflatable cushion assembly.
Figure 7B:
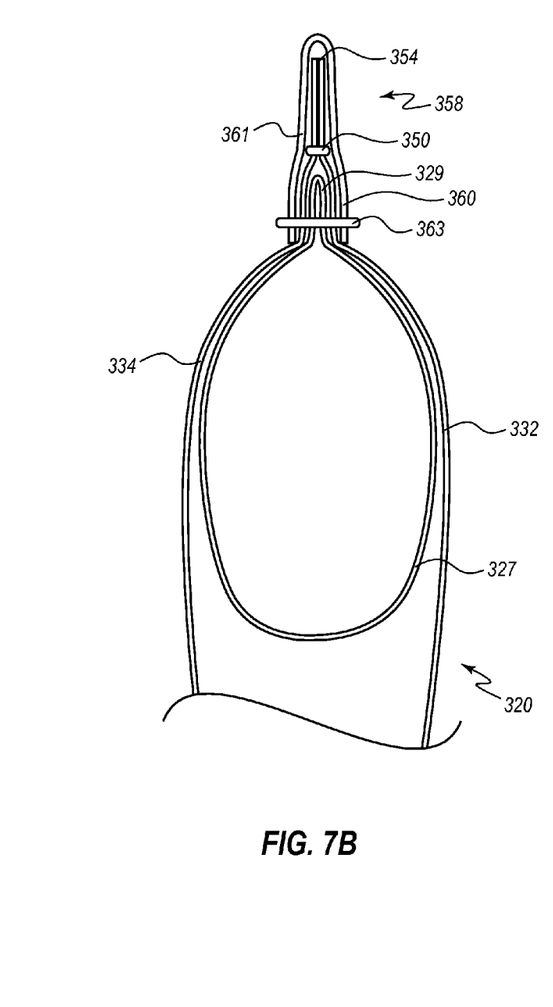
FIG. 7B is a cross-sectional view of the coupling site of FIG. 3A taken along line 7A-7A after inflation of the inflatable cushion assembly.

FIGS. 7A and 7B depict cross-sectional views of the coupling site 358 of FIG. 3A taken along line 7A-7A. FIG. 7A depicts the coupling site 358 before inflation of the inflatable cushion 320 and/or the throat liner 327, whereas in FIG. 7B the coupling site 358 is depicted after inflation of the inflatable cushion 320 and the throat liner 327. Referring to both FIGS. 7A and 7B, the throat liner 327 comprises a first exterior portion 329, wherein the throat liner 327 is positioned within the void of the inflatable cushion 320. The inflatable cushion 320 comprises a front face 332 and a rear face 334, and the front and rear faces 332, 334 meet at an edge 354. A boundary seam 350 is positioned adjacent to the edge 354 of the inflatable cushion 320. Moving outward from the inflatable cushion 320, a first panel 360 and a second panel 361 are coupled to the exterior surface of the inflatable cushion 320. In the illustrated embodiment, the first panel 360 and the second panel 361 are integral, and the first and second panels 360, 361 overlap at least the boundary seam 350 and the first exterior surface 329 of the throat liner 327. The first and second panels 360, 361, as described above, can also be one or more discrete panels. Further, the throat liner 327, the inflatable cushion 320, and the first and second panels 360, 361 are coupled by stitching 363.

In the illustrated embodiment, both of the throat liner 327 and the inflatable cushion 320 are configured to inflate upon activation of the inflator 218. In contrast, the first panel 360 and the second panel 361 are not configured to inflate upon activation of the inflator 218. Inflation of the inflatable cushion 320 and/or the throat liner 327 may exert pressure on the stitching 326 resulting in egress of the inflation gas from the void of the inflatable cushion 320 and/or the aperture of the throat liner 327. The absence of inflation of the first and second panels 360, 361 upon activation of the inflator 218 may assist in maintaining a seal at the stitching 363 and may act to control or inhibit inflation gas egress at the stitching 363. In some embodiments, the throat liner 327 may not be configured to substantially inflate upon activation of the inflator 218.

Figure 8:
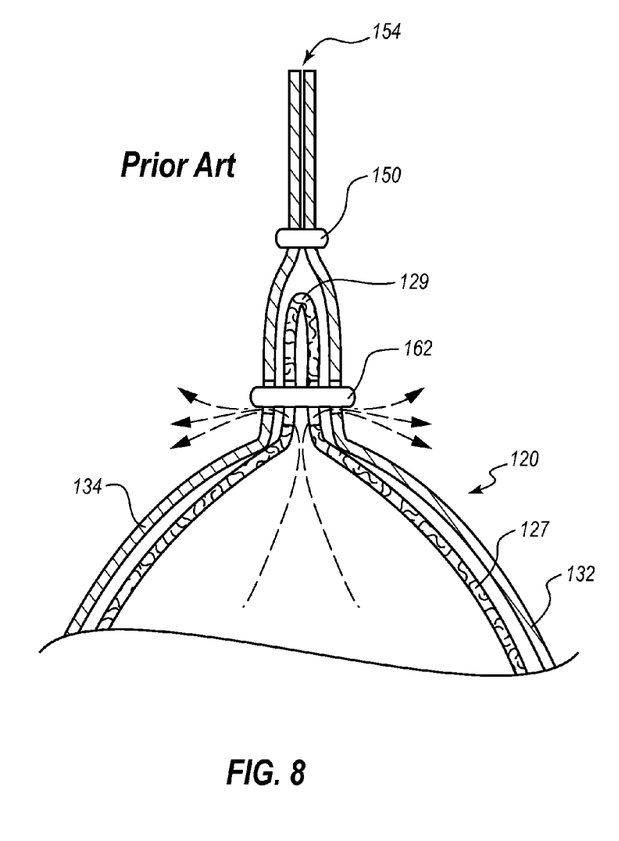
FIG. 8 is a cross-sectional view of an edge portion of a prior art embodiment of an inflatable cushion assembly after inflation of the assembly showing inflation gas egress.

FIG. 8 is a cross-sectional view of an edge portion of a prior art embodiment of an inflatable cushion 120 and a throat liner 127 after activation of an inflator. In the illustrated embodiment, inflation gas egress at or adjacent to stitching 162 is depicted by dashed arrows. In the prior art embodiment, the throat liner 127 comprises a first exterior portion 129, and the throat liner 127 is positioned at or adjacent to a boundary seam 150 within a void of the inflatable cushion 120. The inflatable cushion 120 further comprises a front face 132 and a rear face 134, that meet at an edge 154. Additionally, the boundary seam 150 is positioned adjacent to the edge 154 of the inflatable cushion 120. The throat liner 127 and the inflatable cushion 120 are coupled by the stitching 162. Upon inflation of the illustrated prior art embodiment, both of the inflatable cushion 120 and the throat liner 127 inflate. In some prior art embodiments, the throat liner 127 may not be configured to substantially inflate upon activation of the inflator. Inflation of the inflatable cushion 120 and/or the throat liner 127 exerts pressure on the stitching 162. Said pressure may result in stretching or expansion of at least a portion of the inflatable cushion 120 and/or the throat liner 127 at or adjacent to the stitching 162. Formation of the stitching 162 creates a plurality of holes in the inflatable cushion 120 and the throat liner 127 at or adjacent to the stitching 162. Thus, stretching or expansion of the plurality of holes due to inflation of the inflatable cushion 120 and/or the throat liner 127, may create a plurality of passageways at said holes, and inflation gas can egress via these passageways from the interior void of the inflatable cushion 120.

Figure 9:
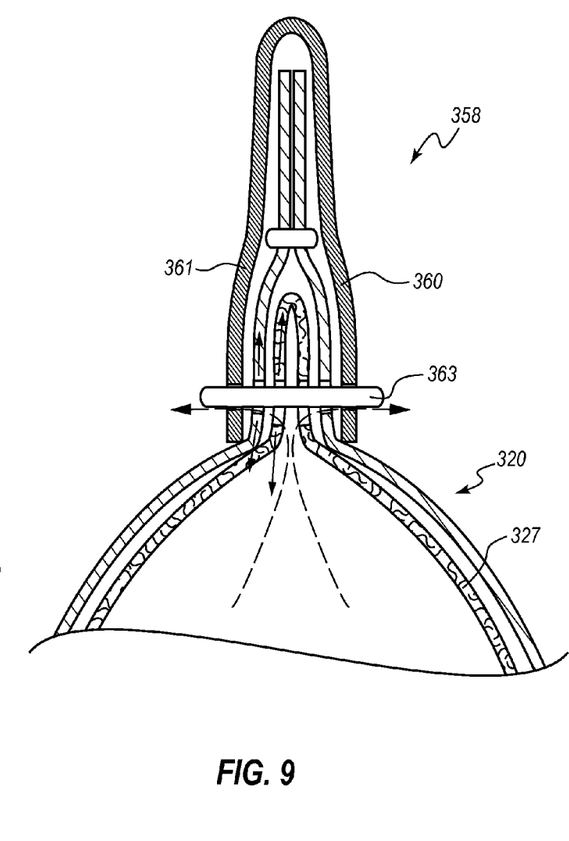
FIG. 9 is a cross-sectional view of the coupling site of FIG. 3 taken along line 7A-7A after inflation of the inflatable cushion assembly showing inflation gas egress.

FIG. 9 is a cross-sectional view of the coupling site 358 of FIG. 3A taken along line 7A-7A after inflation of the inflatable cushion 320 and the throat liner 327. In the illustrated embodiment, inflation gas egress at or adjacent to the stitching 363 is depicted by dashed arrows. As illustrated, the throat liner 327 and the inflatable cushion 320 are in an inflated state. In some embodiments, the throat liner 327 may not be configured to inflate substantially upon activation of the inflator 218. As illustrated, the first panel 360 and the second panel 361 of the coupling site 358 do not substantially inflate upon activation of the inflator 218. Coupling of the first and second panels 360, 361 to both of the throat liner 327 and the inflatable cushion 320 by the stitching 363 may act to control or inhibit egress of the inflation gas at the site of the stitching 363 in the presence of the first and second panels 360, 361. The solid arrows of FIG. 9 depict redirection of inflation gas into the void of the inflatable cushion 320 and/or the aperture of the throat liner 127 at the site of the stitching 363. The first and second panels 360, 361 may remain taut or in an unstretched state at the site of the stitching 363, thus, acting to control or inhibit the egress of the inflation gas from the inflatable cushion 320 and/or the throat liner 327.

Figure 10:
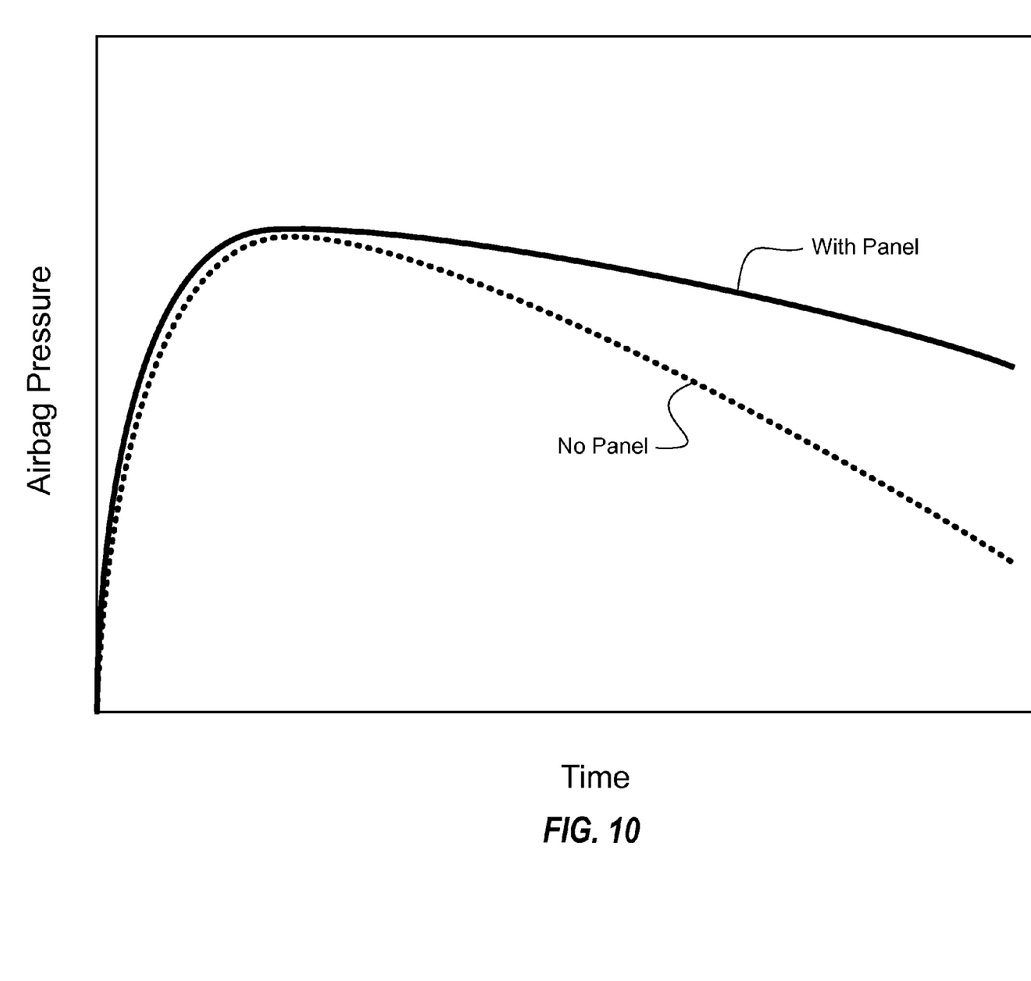
FIG. 10 is a graph depicting change in airbag pressure over time.

In a first example, a sealed inflatable cushion comprising four stitching sites, like the inflatable cushion 120 of FIG. 8, was inflated and change in airbag pressure was measured over time. In a second example, a sealed inflatable cushion comprising four coupling sites, like the inflatable cushion 320 of FIG. 9, was inflated and change in airbag pressure was measured over time. The inflatable cushion of the second example, with the four coupling sites comprising panels, like the first and second panels 360, 361, maintained a greater airbag pressure over time as compared to the inflatable cushion of the first example that did not comprise panels, like the first and second panels 360, 361, at the four stitching sites. See the graph of FIG. 10 comparing the change in airbag pressure over time in an inflatable cushion with panels versus an inflatable cushion without panels.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable cushion assembly, comprising:
   an inflator configured to generate inflation gas in response to predetermined conditions;
   an inflatable cushion coupled to, and in fluid communication with, the inflator at a throat portion, wherein the inflatable cushion is a sealed cushion without vents, wherein the inflatable cushion comprises a front face and a rear face that meet at an edge, wherein the front face and the rear face define a void for receiving the inflation gas, and wherein the inflatable cushion further comprises a boundary seam adjacent to the edge of the inflatable cushion;
   a throat liner comprising an aperture for passage of the inflation gas into the inflatable cushion, and a first exterior surface, wherein the throat liner is disposed at a position within the void of the inflatable cushion, wherein the first exterior surface is positioned at or adjacent to the boundary seam, and wherein the throat liner is coupled to the inflatable cushion at one or more coupling sites, the one or more coupling sites comprising;
      a first panel coupled to an exterior surface of the front face of the inflatable cushion; and
      a second panel coupled to an exterior surface of the rear face of the inflatable cushion, wherein stitching couples at least a portion of the first and second panels, the front and rear faces of the inflatable cushion, and the throat liner at the one or more coupling sites, wherein the stitching extends through each of the void of the inflatable cushion and the aperture of the throat liner, and wherein the first and second panels overlap at least the boundary seam of the inflatable cushion and the first exterior surface of the throat liner.

2. The inflatable cushion assembly of claim 1, wherein the first panel and the second panel do not substantially inflate upon inflation of the inflatable cushion.

3. The inflatable cushion assembly of claim 2, wherein the first panel and the second panel are integral.

4. The inflatable cushion assembly of claim 3, wherein both of the first panel and the second panel comprise silicone.

5. The inflatable cushion assembly of claim 3, wherein the first panel extends from the edge of the inflatable cushion along an exterior surface of the front face of the inflatable cushion and overlaps at least the boundary seam and the first exterior surface of the throat liner, and wherein the second panel extends from the edge of the inflatable cushion along an exterior surface of the rear face of the inflatable cushion and overlaps at least the boundary seam and the first exterior surface of the throat liner.

6. The inflatable cushion assembly of claim 5, wherein the stitching is substantially curved and comprises a first end and a second end, the first end and the second end spaced along a longitudinal length of the inflatable cushion and positioned at or adjacent to the edge of the inflatable cushion.

7. The inflatable cushion assembly of claim 6, wherein the stitching further comprises a first portion comprising a first transition point and a second transition point, wherein the first portion is positioned opposite from the edge of the inflatable cushion, and wherein the first portion stitchingly couples each of the first and second panels, the front and rear faces of the inflatable cushion, and the throat liner.

8. The inflatable cushion assembly of claim 7, wherein the stitching further comprises a second portion extending from both of the first transition point and the second transition point to both of the first end and the second end respectively, wherein the second portion stitchingly couples each of the first and second panels, and the front and rear faces of the inflatable cushion.

9. The inflatable cushion assembly of claim 2, wherein the first panel and the second panel are discrete.

10. The inflatable cushion assembly of claim 9, wherein at least one of the first panel and the second panel comprise foam tape.

11. The inflatable cushion assembly of claim 9, wherein the stitching is substantially curved and comprises a first end and a second end, the first end and the second end spaced along a longitudinal length of the inflatable cushion and positioned at or adjacent to the edge of the inflatable cushion.

12. The inflatable cushion assembly of claim 11, wherein the stitching further comprises a first portion comprising a first transition point and a second transition point, wherein the first portion is positioned opposite from the edge of the inflatable cushion, and wherein the first portion stitchingly couples each of the first and second panels, the front and rear faces of the inflatable cushion, and the throat liner.

13. The inflatable cushion assembly of claim 12, wherein the stitching further comprises a second portion comprising a third transition point and a fourth transition point, wherein the second portion extends toward the edge of the inflatable cushion from both of the first transition point and the second transition point to both of the third transition point and the fourth transition point respectively, and wherein the second portion stitchingly couples each of the first and second panels, and the front and rear faces of the inflatable cushion.

14. The inflatable cushion assembly of claim 13, wherein the stitching further comprises a third portion extending from both of the third transition point and the fourth transition point to both of the first end and the second end respectively, wherein the third portion stitchingly couples the front and rear faces of the inflatable cushion.

15. An airbag, comprising:
   an inflatable cushion coupled to an inflator at a throat portion, wherein the inflatable cushion comprises a front face and a rear face that meet at an edge, wherein the front face and the rear face define a void for receiving the inflation gas, and wherein the inflatable cushion further comprises a boundary seam adjacent to the edge of the inflatable cushion, and wherein the inflatable cushion is a sealed cushion without vents;

a throat liner comprising an aperture for passage of the inflation gas into the inflatable cushion, and a first exterior surface, wherein the throat liner is disposed at a position within the void of the inflatable cushion, wherein the first exterior surface is positioned at or adjacent to the boundary seam, and wherein the throat liner is coupled to the inflatable cushion at one or more coupling sites comprising a panel, the panel comprising;

a first border, a second border at a position opposite from the first border, a middle portion positioned between the first border and the second border, and a slit bisecting at least a portion of the panel at the middle portion, wherein the slit is substantially longitudinally aligned with the edge of the inflatable cushion, wherein at least a portion of the panel adjacent to the first border is coupled to an exterior surface of the front face of the inflatable cushion, wherein at least a portion of the panel adjacent to the second border is coupled to an exterior surface of the rear face of the inflatable cushion, wherein the first border and the second border overlap at least the boundary seam of the inflatable cushion and the first exterior surface of the throat liner, wherein stitching couples at least a portion of the panel, the front and rear faces of the inflatable cushion, and the throat liner at the one or more coupling sites, and wherein the stitching extends through each of the void of the inflatable cushion and the aperture of the throat liner.

16. The airbag of claim 15, wherein the panel does not substantially inflate upon inflation of the inflatable cushion.

17. The airbag of claim 15, wherein the panel further comprises silicone.

18. The airbag of claim 15, wherein the stitching is substantially curved and comprises a first end and a second end, the first end and the second end spaced along a longitudinal length of the inflatable cushion and positioned at or adjacent to the edge of the inflatable cushion.

19. The airbag of claim 18, wherein the stitching further comprises a first portion comprising a first transition point and a second transition point, wherein the first portion is positioned opposite from the edge of the inflatable cushion, and wherein the first portion stitchingly couples each of the first and second panel, the front and rear faces of the inflatable cushion, and the throat liner.

20. The airbag of claim 19, wherein the stitching further comprises a second portion extending from both of the first transition point and the second transition point to both of the first end and the second end respectively, wherein the second portion stitchingly couples each of the first and second paneland the front and rear faces of the inflatable cushion.

21. The airbag of claim 15, wherein the panel is configured to be coupled to the inflatable cushion at or adjacent to one or more cut features.

22. The airbag of claim 15, wherein the inflatable cushion further comprises a plurality of alignment landmarks spaced along a longitudinal length of the inflatable cushion at or adjacent to the edge of the inflatable cushion, wherein at least a portion of the plurality of alignment landmarks are configured to aid in positioning the panel at the one or more coupling sites.

23. The airbag of claim 22, wherein the panel further comprises a plurality of placement holes spaced along a longitudinal length of the panel at one or more sides of the slit, wherein at least a portion of the plurality of placement holes are configured to aid in aligning the panel with at least a portion of the plurality of alignment landmarks.

24. An airbag, comprising:

an inflatable cushion coupled to an inflator at a throat portion, the inflatable cushion comprising an edge, a boundary seam adjacent to the edge of the inflatable cushion, and a void for receiving an inflation gas, wherein the inflatable cushion is a sealed cushion without vents;

a throat liner comprising an aperture for passage of the inflation gas into the inflatable cushion, and a first exterior surface, wherein the throat liner is disposed at a position within the void of the inflatable cushion, wherein the first exterior surface is positioned at or adjacent to the boundary seam, and wherein the throat liner is coupled to the inflatable cushion at one or more coupling sites, the one or more coupling sites comprising;

a first panel coupled to an exterior surface of the inflatable cushion; and a second panel coupled to an exterior surface of the inflatable cushion, wherein the edge of the inflatable cushion is positioned between the first panel and the second panel, wherein stitching couples at least a portion of the first and second panels, the inflatable cushion, and the throat liner at the one or more coupling sites, wherein the first and second panels overlap at least the boundary seam of the inflatable cushion and the first exterior surface of the throat liner, and wherein upon inflation of the inflatable cushion, egress of the inflation gas is inhibited at the site of the stitching by the first panel and the second panel.

25. The airbag of claim 24, wherein the first panel and the second panel do not substantially inflate upon inflation of the inflatable cushion.

26. The airbag of claim 25, wherein the first panel and the second panel further comprise foam tape.

27. The airbag of claim 26, wherein the first panel and the second panel are adhesively coupled to the exterior surface of the inflatable cushion.

28. The airbag of claim 25, wherein the stitching is substantially curved and comprises a first end and a second end, the first end and the second end spaced along a longitudinal length of the inflatable cushion and positioned at or adjacent to the edge of the inflatable cushion.

29. The airbag of claim 28, wherein the stitching further comprises a first portion comprising a first transition point and a second transition point, wherein the first portion is positioned opposite from the edge of the inflatable cushion, and wherein the first portion stitchingly couples each of the first and second panels, the inflatable cushion, and the throat liner.

30. The airbag of claim 29, wherein the stitching further comprises a second portion comprising a third transition point and a fourth transition point, wherein the second portion extends toward the edge of the inflatable cushion from both of the first transition point and the second transition point to both of the third transition point and the fourth transition point respectively, and wherein the second portion stitchingly couples each of the first and second panels, and the inflatable cushion.

31. The airbag of claim 30, wherein the stitching further comprises a third portion extending from both of the third transition point and the fourth transition point to both of the first end and the second end respectively.

* * * * *